US 6,600,573 B2

(12) United States Patent
Shaked et al.

(10) Patent No.: US 6,600,573 B2
(45) Date of Patent: *Jul. 29, 2003

(54) FAST GREEN/MAGENTA DITHERING OF COLOR IMAGES

(75) Inventors: Doran Shaked, Haifa (IL); Izhak Baharav, Givat-Ela (IL); Qian Lin, Santa Clara, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,724

(22) Filed: Sep. 1, 1998

(65) Prior Publication Data

US 2002/0101616 A1 Aug. 1, 2002

(51) Int. Cl.⁷ .................................................. H04N 1/46
(52) U.S. Cl. ...................... 358/1.9; 358/1.1; 358/535; 358/539
(58) Field of Search ................ 358/1.9, 1.1, 1.8, 358/466, 456, 500, 535, 539, 3.13, 3.16, 3.17, 3.18

(56) References Cited

U.S. PATENT DOCUMENTS

| 4,809,063 | A |   | 2/1989 | Moriguchi et al. ............ 358/75 |
| 5,241,347 | A | * | 8/1993 | Kodama ...................... 355/246 |
| 5,768,411 | A | * | 6/1998 | Shu et al. .................... 382/162 |
| 6,020,978 | A | * | 2/2000 | Cooper et al. ............... 358/1.9 |
| 6,031,627 | A | * | 2/2000 | Kakutani ..................... 358/1.9 |

FOREIGN PATENT DOCUMENTS

| EP | 0 791 895 A2 | 8/1997 | .......... G06T/11/00 |
| EP | 0 836 317 A2 | 4/1998 | .......... H04N/1/405 |

OTHER PUBLICATIONS

Qing Yu and Kevin J. Parker, "Adaptive color halftoning for minimum perceived error using the Blue Noise Mask" Proceedings of the SPIE vol. 3018, 1997, pp. 272–276.

* cited by examiner

Primary Examiner—Thomas D. Lee

(57) ABSTRACT

A color image is converted into a dot pattern for display by a color printer. The image is separated into Cyan, Magenta and Yellow color planes; a dither matrix is applied to the Cyan plane; an inverse of the dither matrix is applied to the Magenta plane; and either the dither matrix or the inverse dither matrix is applied to the Yellow plane.

23 Claims, 3 Drawing Sheets

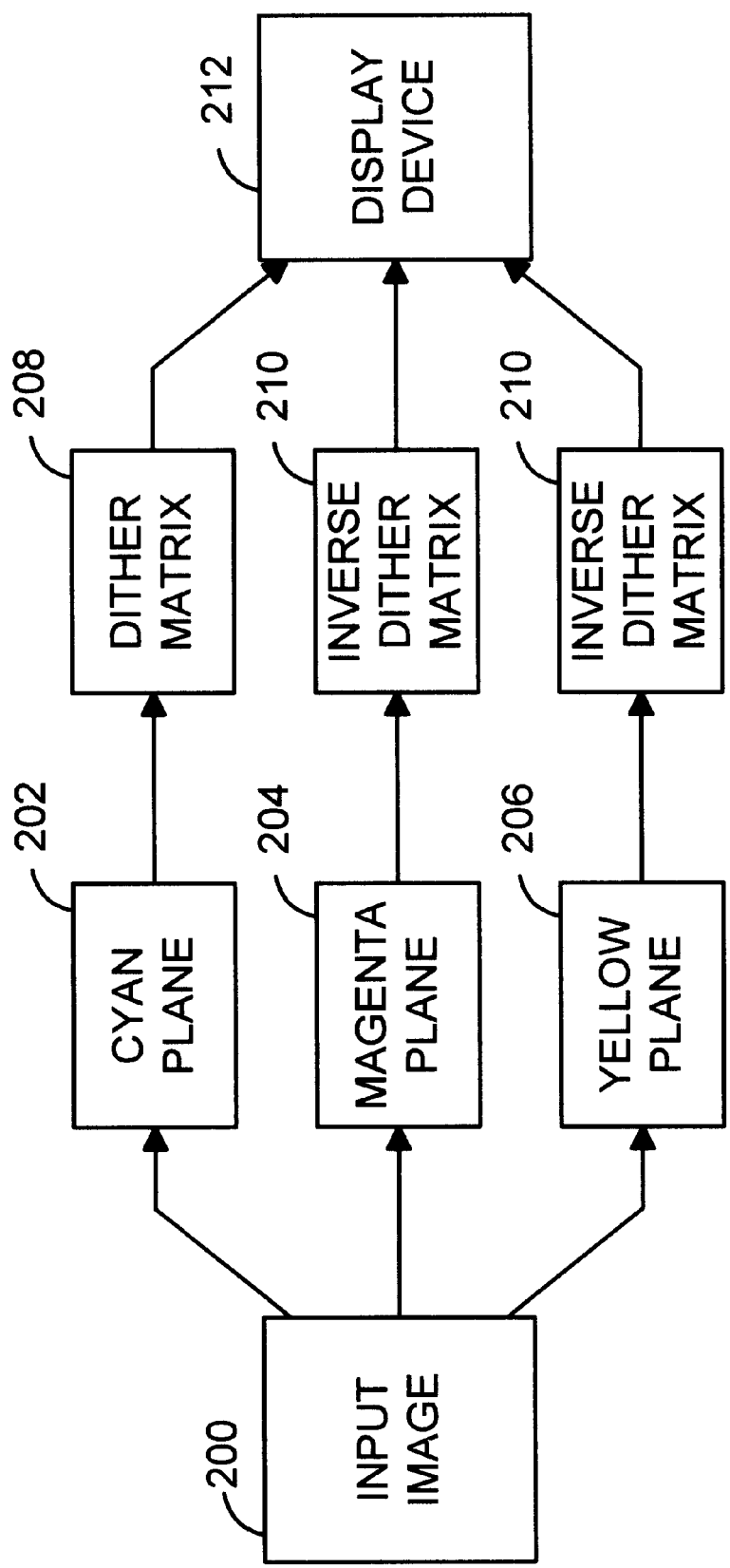

FAST GREEN/MAGENTA DITHERING OF COLOR IMAGES

BACKGROUND OF THE INVENTION

The invention relates generally to the display of digital images. More specifically, the invention relates to an apparatus and method of performing dithering of color images.

A computer monitor having 24-bit color capability can display photorealistic images. Such high quality can be achieved in part because the 24-bit color capability allows the computer monitor a choice of 16.7 million discrete colors for each individual pixel of an image being displayed.

A conventional inkjet printer, on the other hand, does not have a choice of 16.7 million colors for printing an image. The conventional inkjet printer deposits dots of colored ink on a sheet of paper. Within the space of each dot, the conventional inkjet printer might deposit yellow, cyan and magenta ink in combinations that produce one of eight solid colors: cyan, yellow, magenta, black, white, red, green and blue. Thus, the conventional inkjet printer has a choice of eight printable colors at each pixel.

The inkjet printer might use a digital halftoning method to create a perception that it is printing with a wider range of colors than it actually is. When printing a color patch, the printer can place dots of different colors in a high frequency pattern. When viewing the high frequency pattern, the human visual system "applies" a low-pass filter and perceives only the average color of the dots in the pattern. Thus, a dot pattern including black and white dots will appear as a shade of gray. The shade of gray will depend upon the relative quantities of black and white dots in the pattern.

Monochrome dithering is a halftoning method in which the gray values of a monochrome image are compared against an array of thresholds. Ink dots are placed at those locations where the pixel values are less than or equal to the corresponding threshold values. Standard (Cartesian) color dithering is an overlay of three monochrome dithering processes, each of which is applied separately to a single color plane. When a patch of a halftone color is printed, potentially all eight colors are used.

To produce a good color halftone, the color dots are placed such that their placement pattern is visually unnoticeable. Additionally, the dot colors are selected such that the local average color of the dots matches the desired color of the color patch.

However, there are problems associated with halftoning methods, especially at printing resolutions of up to 600 dots per inch ("dpi"). Because inkjet dots at 600 dpi can still be resolved by the human eye, the dots might be perceived as artifacts and other types of noise. The noise can degrade the quality of the printed image. A grainy color image might result.

Efforts have been made to improve print quality by increasing the color choices at each dot. The color choices have been increased by controlling the amount of ink deposited at each dot. Varying the amount of ink can control the intensity at each dot. The HP DeskJet 850C inkjet printer, available from the Hewlett-Packard Company, can vary the amount of ink deposited at each dot to print up to 64 different color and grayscales choices at each dot. Smoother dither patterns and halftones result in a less grainy image.

Other efforts have been made to minimize the noise in the image in order to produce smoother dither patterns and halftones. For example, efforts have been directed towards determining optimal patterns for placing the dots. Efforts have also been directed towards determining an optimal number of dots that should be used for each color.

Efforts have also been directed towards reducing the contrast in color combinations used to render color patches. The color contrast may be minimized by minimizing the number of black and white dots used in the same color patch. Rather than printing black dots on a white background, grays using non-overlapping cyan, magenta and yellow dots would be printed.

SUMMARY OF THE INVENTION

Contrast in color combinations used to render color patches may be reduced by the present invention. A plurality of thresholds are applied to a Cyan color plane of a color image, and an inverse of the plurality of thresholds is applied to a Magenta color plane of the color image. A Yellow color plane of the color image is also processed. In this manner, the color image is converted into a color pattern for display by an imaging device such as a printer.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 is an illustration of an alternative method of performing G/M dithering according to the present invention.

DETAILED DESCRIPTION OF THE INVENTION

Figure 1:
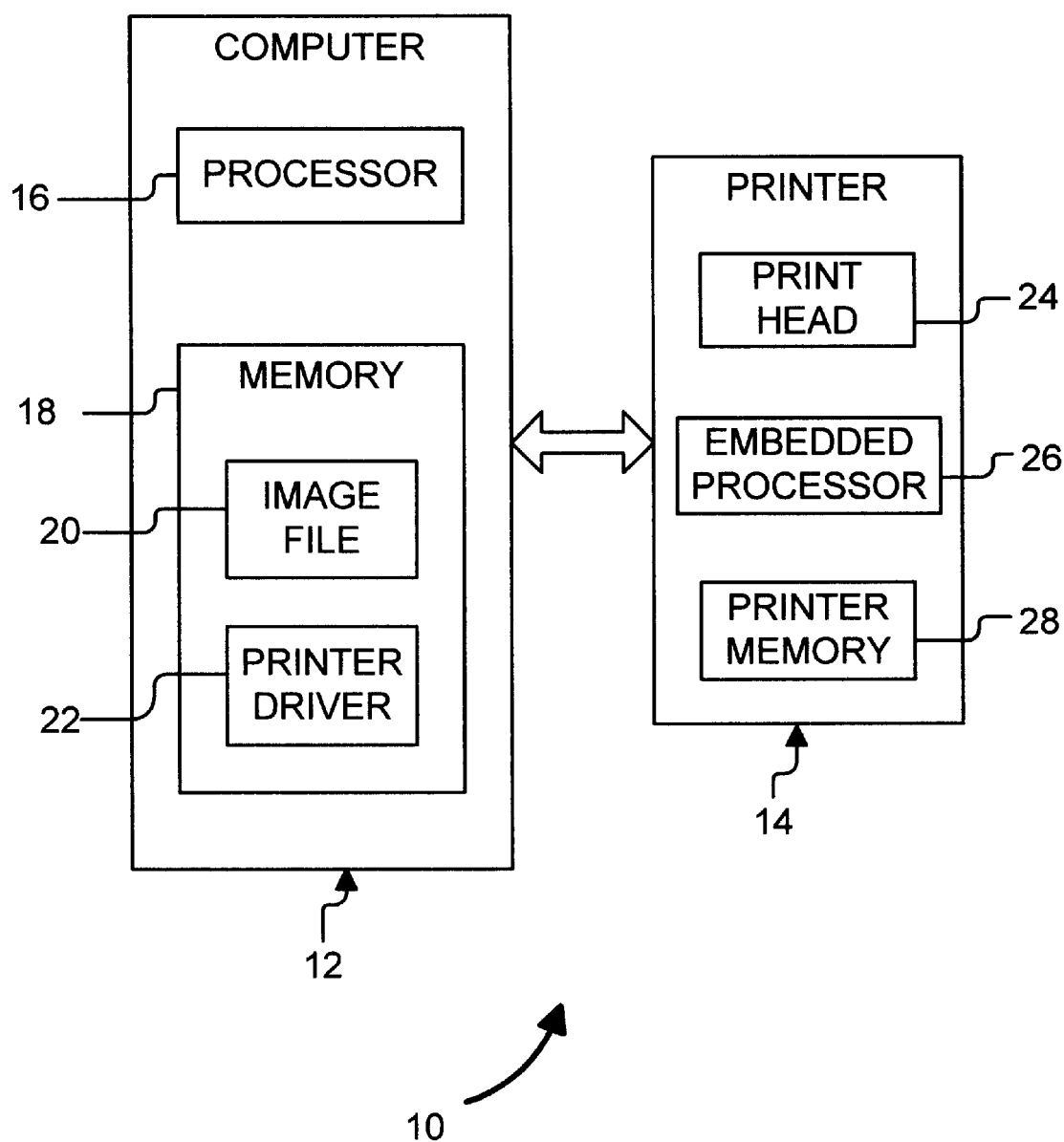
FIG. 1 is an illustration of a printer and a computer according to the present invention.

As shown in the drawings for purposes of illustration, the present invention is described in connection with a computer and a printer. The printer can print only a limited range of display colors. However, Green/Magenta ("G/M") color dithering is used to create a perception that a wider range of display colors is being printed. G/M dithering reduces the contrast in color combinations used to render color patches in a printed image. Moreover, the G/M dithering is performed as a series of point operation on each color plane. Consequently, the G/M dithering is fast.

FIG. 1 shows a computer system 10 including a computer 12 and a printer 14. The printer 14 can be an inkjet printer. For exemplary purposes only, the printer 14 will be described in connection with an eight-color printer that can print up to resolutions of 600 dpi. Within any space on a white sheet of paper, the printer 14 can deposit Cyan, Magenta and Yellow ink in a combination that produces any one of the following eight colors: black ("K"), blue ("B"), red ("R"), green ("G"), magenta ("M"), cyan ("C"), yellow ("Y") and white ("W").

The computer 12 includes a processor 16 and computer memory 18. An image file 20 is stored in the computer memory 18 or processed on the fly. For exemplary purposes only, the image file 20 represents a single image. The image is represented in RGB color space by 24-bit words. Each 24-bit word corresponds to a pixel of the image. For each 24-bit word, a first group of eight bits represents intensity of the Red component of the corresponding pixel, a second group of eight bits represents intensity of the Green component, and a third group of eight bits represents intensity of the Blue component. Each 24-bit word allows a range of $2^{24}$ (approximately 16.7 million) colors to be represented for each pixel.

To print the image, the computer 12 accesses the image file 20 and a printer driver 22 stored in computer memory 18. The printer driver 22 includes a plurality of executable instructions that, when executed, instruct the processor 16 to interpolate the image, if necessary, to match the printer resolution (e.g., 600 dots per inch); create a map of dot patterns representing the interpolated image; and send the dot map to the printer 14 for printing.

The printer 14 can only display a range of eight colors. However, the printer driver 22 uses G/M dithering to create a perception that a wider range of colors is being printed. For each dot pattern that represents a solid patch of color, the local average of the dot colors in the dot pattern is equal to the desired color of the color patch. The dots are placed in a pattern that reduces perceptibility.

The dot colors are also selected to reduce brightness variations in patches of solid color. The human visual system is more perceptible to changes in brightness than to changes in chrominance, which average out at much lower frequencies. Reducing the brightness variations in the solid color patches minimizes perceptible noise in the image.

The printer 14 receives the dot patterns and prints out the image on a sheet of paper. The printer 14 includes a CMY print head 24 movable along a rail, a servo for controlling the position of the print head 24 along the rail as well as the firing of the print head 24. The print head servo includes an embedded processor 26 and memory 28. The printer memory 28 could include executable instructions for instructing the embedded processor 26 to perform the G/M dithering.

Figure 2:
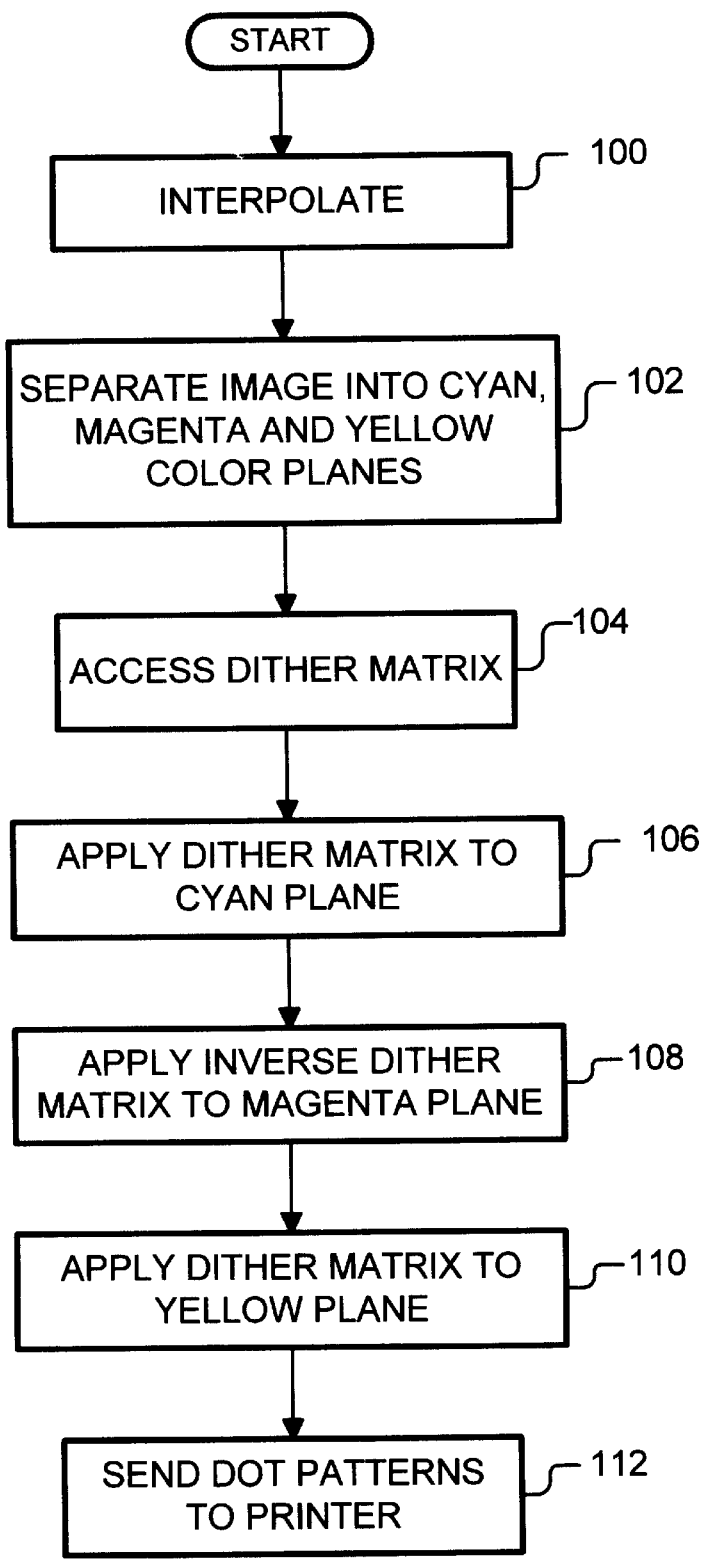
FIG. 2 is an illustration of a method of performing G/M dithering according to the present invention.

FIG. 2 illustrates the G/M dithering method in greater detail. The processor 16 interpolates the image file 20, if necessary, so that each pixel in the image file 20 corresponds to a dot in the printed image (block 100).

The processor 16 separates the interpolated image into three separate color planes (block 102). Because the print head 24 deposits ink dots of Cyan, Magenta and Yellow, the image is separated into Cyan, Magenta and Yellow color planes. If the words in the image file 20 represent Red, Green and Blue components, the processor 16 will also perform translation to the Cyan, Magenta and Yellow color components.

Next the processor 16 accesses a dither matrix B/W from memory 18 (step 104). The dither matrix B/W, which includes an array of threshold values, also forms a part of the printer driver 22. If the dither matrix B/W does not cover the entire image, it may be tiled across the image until the entire image is covered.

The dither matrix B/W may be taken from any monochrome dither screen. These screens may be classified according to their threshold placement pattern. Choices of threshold placement patterns for the dither matrix include ordered dithers (which have been sub-classified as either cluster dot dither and sparse dot dither) and stochastic dithers such as Blue Noise dither, Void and Cluster dither and Super Smooth dither. See, for example, T. Mitsa and K. J. Parker, "Digital Halftoning using a Blue Noise Mask", IS&T/SPIE 1991 International Symposium on Electronic Imaging: Science and Technology, San Jose, Calif. (1991); R. Ulichney, "The Void-and-Cluster Method for Dither Array Generation", IS&T/SPIE 1993 International Symposium on Electronic Imaging: Science and Technology, San Jose, Calif. (1993); and Q. Lin U.S. Pat. No. 5,317,418 entitled "Halftone Images using Special Filters" and assigned to the assignee of the present invention.

The dither matrix B/W is applied to the Cyan plane (block 106); an inverse of the dither matrix B/W is applied to the Magenta plane (block 108); and the dither matrix B/W is applied to the Yellow plane (block 110). The inverse dither matrix $\overline{B/W}$ having an mxn array of 8-bit thresholds may be computed as follows:

$$\overline{B/W}(i, j) = 255 - B/W(i, j)$$

where i and j are the coordinates of a threshold in the dither matrix B/W for i=0, 1, . . . , m; and j=0, 1, . . . , n.

Each color plane is processed separately. Each pixel in each plane is simply compared to the corresponding threshold. For each color plane, ink will be placed at the $(i,j)^{th}$ locations where the $(i,j)^{th}$ RGB space value is less than (or equal to) the corresponding $B/W(i,j)^{th}$ threshold value. Alternatively for each color plane, ink will be placed at the $(i,j)^{th}$ locations where the $(i,j)^{th}$ CMY space value is larger than the corresponding $B/W(i,j)^{th}$ threshold value. Thus, the masking in each plane is performed as a series of point operations.

Resulting from the masking of the three color planes are three dot pattern planes. The three separate planes of dot patterns may be combined and sent to the printer 14 for printing, or the three separate planes may be sent to the printer 14 for printing (block 112).

If the thresholds at an arbitrary location (i,j) are viewed as three-dimensional point coordinates T(i,j) having components corresponding to the three color planes such that $T(i,j)=\{B/W(i,j),\overline{B/W}(i,j),B/W(i,j)\}$, then T(i,j) is located on the diagonal of RGB cube between Green and Magenta. Uniform distribution of the thresholds along the G/M diagonal ensures that a color patch is preserved.

Thus disclosed is an invention that reduces the variation in brightness in an image. Regardless of the dither matrix used, the monochrome dot placement pattern and frequency domain features of the dither matrix are maintained. The human visual system is more perceptible to changes in brightness than to changes in chrominance, which average out at much lower frequencies. Reducing the brightness variations reduces perceptible noise in the image.

The G/M dithering is performed as a series of point operations on each pixel in each color plane. Therefore, the G/M dithering can be performed quickly.

The invention is not limited to the specific embodiment described above. For example, FIG. 3 shows that an inverted dither matrix 210 could be applied to the Yellow plane 206 of a color image 200. The dither matrix 208 is still applied to the Cyan plane 202, and the inverted dither matrix 210 is still applied to the Magenta plane 204. Applying the inverted dither matrix 210 to the Yellow plane 206 causes the dithering to be performed along the Red/Cyan diagonal instead of the G/M diagonal. Brightness variations in the image 200 are also reduced when dithering is performed along the Red/Cyan diagonal. The dot patterns resulting from the Cyan, Magenta and Yellow are sent to a display device 212 such as a printer.

The invention is not limited to the use of a dither matrix. Instead of storing a dither matrix in computer memory, thresholds may be calculated on the fly. A threshold would be compared to a pixel in the Green plane, and a compliment of a threshold would be compared to a corresponding pixel in the Magenta plane. The threshold may then be discarded after being used. See a patent application entitled "Halftone Dithering With and Without Mask" by Michael D. McGuire and Rodney Shaw, Serial No. 08/729,082, filed on Oct. 10, 1996 and incorporated herein by reference (halftoned binary images are produced from grayscale images by taking a region of pixels from the input image and computing thresholds for every pixel in the region such that locations of the thresholds close in value are as random as possible consistent with being anticorrelated).

The present invention is not limited to a printer. The present invention may be applied to any device that displays less than a full range of colors.

Accordingly, the present invention is not limited to the specific embodiments described above. Instead, the present invention is construed according to the claims that follow.

What is claimed is:

1. A method of converting a pixel of an image into a color pattern for display by an imaging device, the method comprising:

applying a threshold to the pixel in a Cyan color plane of the image;

applying an inverse of the threshold to the pixel in a Magenta color plane of the image; and applying the threshold or the inverse to the pixel in a Yellow color plane of the image;

wherein the color planes are processed independently such that information in one color plane does not affect dithering in the other color plane.

2. The method of claim 1, further comprising applying the threshold to the Yellow color plane of the image, whereby a threshold distribution along a Green/Magenta diagonal of an RGB color cube is applied to the image.

3. The method of claim 1, further comprising applying the inverse of the threshold to the Yellow color plane of the image, whereby a threshold distribution along a Red/Cyan diagonal of an RGB color cube is applied to the image.

4. The method of claim 1, wherein an inverse threshold is a compliment of a corresponding threshold.

5. The method of claim 1, wherein the thresholds are applied as point operations.

6. The method of claim 1, wherein the thresholds are stored in a dither matrix, the dither matrix and an inverse of the dither matrix applied to the color planes.

7. The method of claim 1, wherein the thresholds are computed on the fly.

8. Apparatus for converting an image represented by a plurality of pixels into a color pattern for display by an imaging device, the apparatus comprising:

means for providing a plurality of thresholds;

means for independently applying the thresholds to the pixels in a Cyan color plane of the image;

means for independently applying inverses of the thresholds to the corresponding pixels in a Magenta color plane of the image such that information in one color plane does not affect dithering in the other color plane; and means for applying either the thresholds or the inverses to the corresponding pixels in a Yellow color plane of the image.

9. The apparatus of claim 8, wherein the means applies the plurality of thresholds to the Yellow color plane of the image, whereby a threshold distribution along a Green/Magenta diagonal of an RGB color cube is applied to the image.

10. The apparatus of claim 8, wherein the means applies the inverse thresholds to the Yellow color plane of the image, whereby a threshold distribution along a Red/Cyan diagonal of an RGB color cube is applied to the image.

11. The apparatus of claim 8, wherein the means for providing the thresholds includes computer memory, the thresholds being stored in a dither matrix in the computer memory, the dither matrix and an inverse of the dither matrix being applied to the color planes of the image.

12. The apparatus of claim 8, wherein the means for providing the thresholds includes means for computing the thresholds on the fly.

13. Apparatus for converting an image represented by a plurality of pixels into a color pattern for display by an imaging device, the apparatus comprising:

a processor for applying a plurality of thresholds to the pixels in a Cyan color plane of the image, applying an inverse of the plurality of thresholds to the corresponding pixels in a Magenta color plane of the image, and applying one of the plurality of thresholds and the inverse of the plurality to the corresponding pixels in a Yellow color plane of the image, the color planes processed independently such that information in one color plane does not affect dithering in the other color plane.

14. The apparatus of claim 13, wherein the processor applies the plurality of thresholds to the Yellow color plane of the image.

15. The apparatus of claim 13, wherein the processor applies the inverse of the plurality of thresholds to the Yellow color plane of the image.

16. The apparatus of claim 13, further comprising processor memory encoded with a dither matrix including the plurality of thresholds, whereby the processor applies the dither matrix to the Cyan color plane, the inverse of the dither matrix to the Magenta color plane, and one of the inverse and the plurality to the Yellow color plane.

17. The apparatus of claim 13, wherein the processor computes the plurality of thresholds on the fly.

18. An article for instructing a processor to convert a color image into a color pattern for display by an imaging device, the article comprising:

memory; and a plurality of executable instructions encoded in the memory, the instructions, when executed, instructing the processor to independently apply a plurality of thresholds to pixels in a Cyan color plane of the image, independently apply an inverse of the plurality of thresholds to corresponding pixels in a Magenta color plane of the image, and independently apply one of the inverse and the plurality to corresponding pixels in a Yellow color plane of the image.

19. The article of claim 18, wherein the executable instructions instruct the processor to apply the plurality of thresholds to the Yellow color plane of the image.

20. The article of claim 18, wherein the executable instructions instruct the processor to apply the inverse of the plurality of thresholds to the Yellow color plane of the image.

21. The article of claim 18, wherein the memory is further encoded with a dither matrix including the plurality of thresholds, whereby the executable instructions instruct the processor to apply the dither matrix to the Cyan color plane, an inverse of the dither matrix to the Magenta color plane, and either the plurality of thresholds or the inverse thereof to the Yellow color plane.

22. The article of claim 18, wherein the executable instructions further instruct the processor to compute the plurality of thresholds on the fly.

23. Apparatus for converting an image represented by a plurality of pixels into a color pattern for display by an imaging device, the imaging device having a limited set of display colors, the apparatus comprising:

a processor for applying a B/W dither matrix to a Cyan color plane of the image, applying an inverse of the dither matrix to a Magenta color plane of the image, and applying the dither matrix or the inverse to a Yellow color plane of the image, the color planes processed independently such that information in one color plane does not affect dithering in the other color planes.

* * * * *